(12) United States Patent
Draser

(10) Patent No.: US 8,235,597 B2
(45) Date of Patent: Aug. 7, 2012

(54) COMBINED RADIAL-AXIAL ROLLER BEARING

(75) Inventor: Georg Draser, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 296 days.

(21) Appl. No.: 12/688,017

(22) Filed: Jan. 15, 2010

(65) Prior Publication Data

US 2010/0189388 A1 Jul. 29, 2010

(30) Foreign Application Priority Data

Jan. 16, 2009 (DE) .................... 10 2009 004 920

(51) Int. Cl.
*F16C 19/34* (2006.01)
(52) U.S. Cl. ..................................... 384/455
(58) Field of Classification Search .......... 384/452–455
See application file for complete search history.

(56) References Cited

U.S. PATENT DOCUMENTS

| | | | | |
|---|---|---|---|---|
| 3,168,359 A | * | 2/1965 | Murphy | 384/454 |
| 3,341,263 A | * | 9/1967 | Pitner | 384/455 |
| 3,632,178 A | * | 1/1972 | Pitner | 384/455 |
| 3,930,692 A | * | 1/1976 | Condon et al. | 384/455 |
| 3,934,956 A | * | 1/1976 | Pitner | 384/455 |
| RE29,583 E | * | 3/1978 | Eckhardt et al. | 384/455 |
| 4,168,869 A | * | 9/1979 | Stephan | 384/455 |
| 5,158,375 A | * | 10/1992 | Uchida et al. | 384/455 |
| 7,575,377 B2 | * | 8/2009 | Fick et al. | 384/455 |

FOREIGN PATENT DOCUMENTS

| | | |
|---|---|---|
| AT | 310510 B | 10/1973 |
| DE | 2600955 A1 | 7/1976 |
| DE | 69114224 T2 | 6/1996 |

* cited by examiner

*Primary Examiner* — Thomas R Hannon
(74) *Attorney, Agent, or Firm* — Lucas & Mercanti, LLP; Klaus P. Stoffel

(57) ABSTRACT

A combined radial-axial rolling bearing for rotatably mounting a rotary body in the region of a diameter step. The rolling bearing has a radial bearing unit which is assigned to a circumferential surface of the rotary body and which at least has a radial bearing ring, and an axial bearing unit which is assigned to an axial surface of the rotary body and which at least has an axial bearing ring. To mount the rotary body radially in the region of the larger diameter, the radial bearing unit is assigned to a circumferential surface which has the larger diameter. The radially outer rim of the axial bearing ring is latched to a rim of the radial bearing ring which faces toward the radially outer rim, such that the two bearing rings form a structural unit which can be assembled in one work step, but otherwise remain functionally separate.

8 Claims, 2 Drawing Sheets

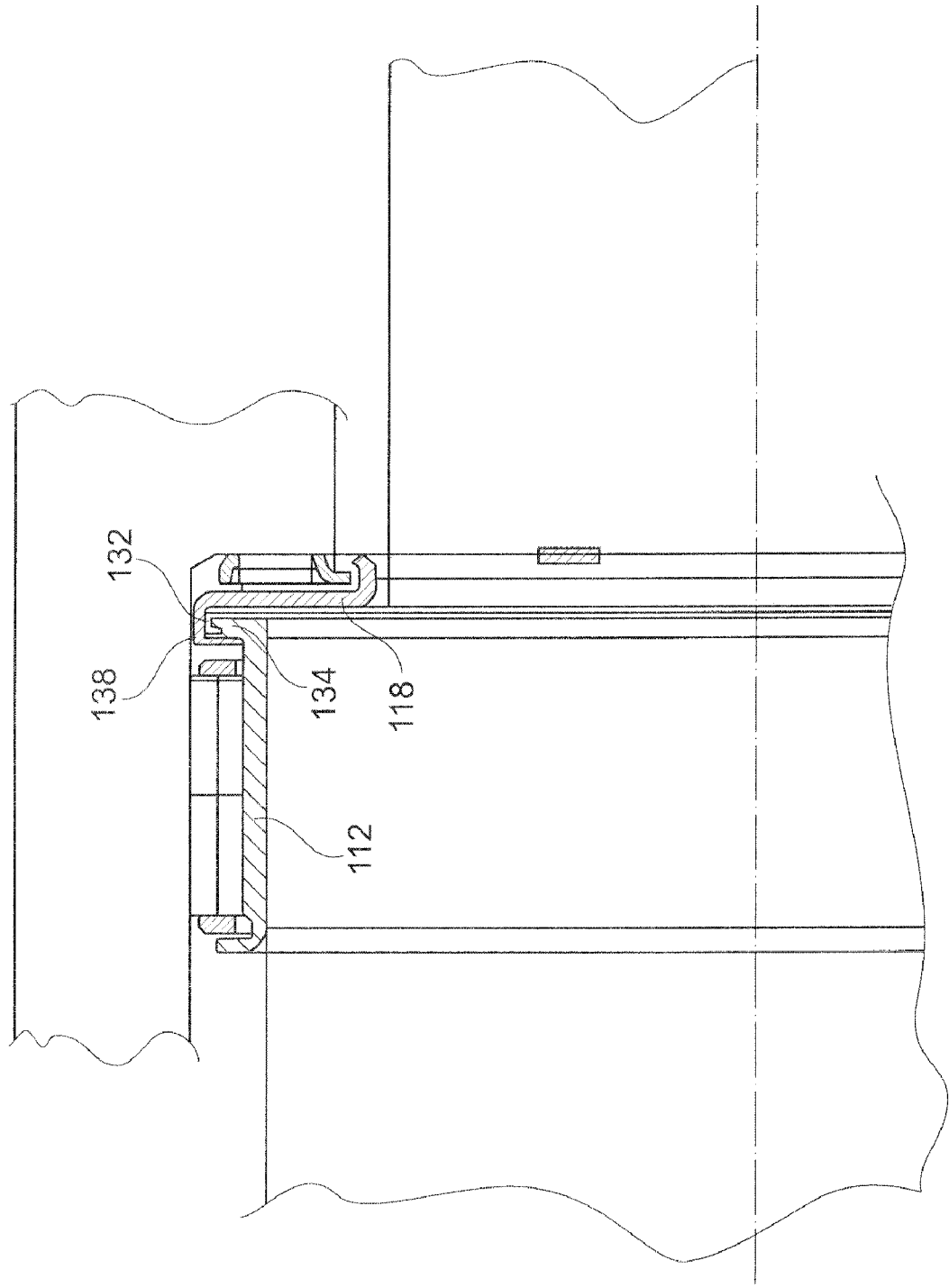

COMBINED RADIAL-AXIAL ROLLER BEARING

This application claims the priority of DE 10 2009 004 920.7 filed Jan. 19, 2009, which is incorporated by reference herein.

FIELD OF THE INVENTION

The invention relates to a combined radial-axial rolling bearing for mounting a rotary body in the region of a diameter step between a larger and a smaller diameter, comprising a radial bearing unit which is assigned to a circumferential surface of the rotary body and which at least has a radial bearing ring, and comprising an axial bearing unit which is assigned to an axial surface of the rotary body and which at least has an axial bearing ring. A typical application of such combined radial-axial rolling bearings is, for example, for transmission shafts which are arranged in a transmission housing and have a stepped diameter and which are subjected to radial and axial loading.

BACKGROUND OF THE INVENTION

Rolling bearings are already known which can accommodate both radial forces and axial forces. Said rolling bearings are designed, for example, as angular-contact ball bearings or angular-contact roller bearings, with the respective rolling bodies being arranged between a bearing inner ring and a bearing outer ring which, for this reason, have relatively large radial dimensions. It is considered to be a further disadvantage in particular of angular-contact roller bearings that the axial forces are transmitted between the bearing rings and the rollers via flanges formed on the bearing rings, such that bearings of said type have comparatively high internal bearing friction. Furthermore, the functions firstly of radial mounting and secondly of axial mounting cannot be separated from one another, such that, for example, the occurrence of axial play as a result of thermal expansion of the bearing or of the components which are connected thereto will always also have an effect on the radial play.

Also already known are combined radial-axial rolling bearings of the type specified in the preamble of claim 1 which comprise in each case a radial bearing unit and an axial bearing unit which is connected to but functionally separated from said radial bearing unit. DE 691 14 224 T2 presents a radial-axial rolling bearing of said type for mounting a radially stepped shaft, in which radial-axial rolling bearing the radial bearing unit is designed as a needle bearing and is assigned to the circumference of the smaller diameter, and in which radial-axial rolling bearing the axial bearing unit which is assigned to the axial surface is designed as a ball bearing whose raceways are formed firstly by an axial bearing ring which bears against the axial surface of the shaft and secondly by a separate raceway ring which bears against an axial surface of the housing. The axial bearing ring and the radial bearing ring are not directly connected to one another and to the raceway ring which is required for the function of the bearing, and therefore said bearing does not form a structural unit and, for example, cannot be assembled in one work step. Furthermore, the known bearing is not suitable for shaft housing designs in which the radial bearing unit is to be assigned to the respectively larger diameter.

A similar radial and axial bearing in which the radial bearing unit is likewise assigned to the circumferential surface with the smaller diameter is presented, for example, in DE 2 600 955.

The patent AT 310 510, in particular FIG. 6 thereof, has duly already disclosed a combined radial-axial bearing in which the radial bearing unit is assigned to the circumferential surface of the larger diameter. Here, however, the radial bearing unit and the axial bearing unit are arranged in a single bearing shell which is common to both bearing units, such that here, too, complete separation of the radial bearing function and the axial bearing function is not provided.

OBJECT OF THE INVENTION

Taking the discussed disadvantages of the known prior art as a starting point, the invention is therefore based on the object of creating a combined radial-axial rolling bearing of the type specified in the preamble of claim 1 in which the radial bearing function and the axial bearing function are completely separated from one another, which forms a structural unit and which can be assembled in one work step, and with which the component to be mounted can be mounted via the circumferential surface with the larger diameter.

DESCRIPTION OF THE INVENTION

The invention proceeds from a combined radial-axial rolling bearing for rotatably mounting a rotary body in the region of a diameter step, comprising a radial bearing unit which is assigned to a circumferential surface of the rotary body and which at least has a radial bearing ring, and comprising an axial bearing unit which is assigned to an axial surface of the rotary body and which at least has an axial bearing ring. Here, it is provided according to the invention that the radial bearing unit is assigned to the circumferential surface which has the larger diameter, with the radially outer rim of the axial bearing ring being latched to that rim of the radial bearing ring which faces toward said radially outer rim.

The connection of the two bearing rings using latching means makes a structural unit out of the two bearing units, which structural unit can be assembled in a single work step by virtue of the radial bearing unit being placed onto an outer circumferential surface of the rotary body to be mounted, or inserted into an inner circumferential surface, wherein the axial bearing unit bears against the axial surface of said circumferential body. The latching connection makes it possible secondly for the two bearing units to remain functionally separate, such that, for example, a radial play and an axial play can be set independently of one another and do not influence one another. The design of the radial-axial rolling bearing remains simple and makes it possible, in particular, for the radial mounting of the rotary body to be provided via the circumferential surface with the larger diameter and, therefore, to obtain the greatest possible load rating.

In one refinement of the radial-axial rolling bearing, the radial bearing unit comprises a radial bearing ring which is designed as an inner ring, and a radial bearing cage which is arranged on the outer side of said radial bearing ring and holds the rolling bodies. The radial bearing ring which is designed as an inner ring is seated on an outer circumferential surface of a first component. The rolling bodies of the radial bearing accordingly roll, on the one hand, on said inner ring and on the other hand on an inner circumferential surface, which surrounds the radial bearing unit, of a second component which is designed and machined correspondingly.

In a further refinement of the invention, the axial bearing unit comprises an axial bearing ring which bears against the axial surface, and an axial bearing cage which is arranged on that side of said axial bearing ring which faces away from the axial surface, which bearing cage holds the rolling bodies. In this case, the rolling bodies roll, on the one hand, on the axial bearing ring which bears against the axial surface of the first component and on the other hand, on a correspondingly designed axial surface, which is situated opposite said axial bearing ring, of the second component. In this way, the two rolling surfaces which are not formed by the bearing rings are assigned to the same component, which is composed of a material which is suitable for forming rolling surfaces and which can, for example, be machined in one manufacturing chucking operation.

To latch the two bearing rings to one another, it is provided in a further refinement of the invention that latching means are arranged on at least one of the rims, which face toward one another, of the radial bearing ring, on the one hand, or of the axial bearing ring, on the other hand, into which latching means the respective other of the rims is latched. Said latching means may for example be formed as latching lugs which are arranged distributed about the associated rim. The rolling bodies of the radial bearing unit and/or of the axial bearing unit are designed preferably as rollers or needles, which provide significantly better load ratings than balls. In a further refinement of the invention, the radial bearing ring and/or the axial bearing ring are/is formed in each case as a sheet-metal ring shaped in a non-cutting process. Such a design of the bearing rings is simple in production terms and can therefore be realized at low cost.

BRIEF DESCRIPTION OF THE DRAWINGS

The invention is explained in more detail below on the basis of the appended drawings of several embodiments, in which:

FIG. 2 shows a view similar to FIG. 1, but with latching means formed on the axial bearing ring.

DETAILED DESCRIPTION OF THE DRAWINGS

Figure 1:
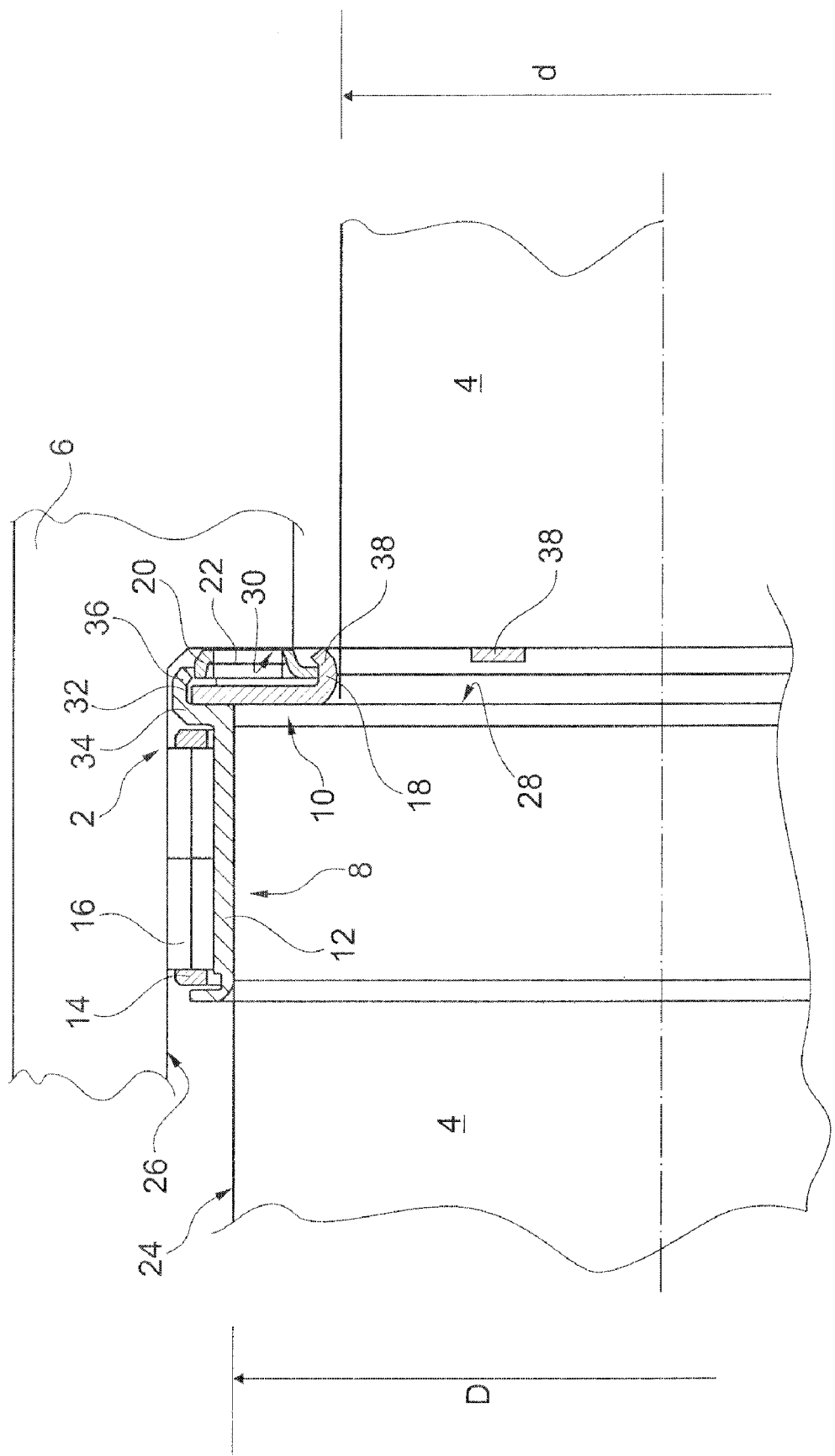
FIG. 1 shows a partial longitudinal section through a combined radial-axial needle bearing with latching means formed on the radial bearing ring.

Accordingly, FIG. 1 shows a combined radial-axial needle bearing 2 in a partial sectional view. In the present exemplary embodiment, said radial-axial needle bearing 2 serves to rotatably mount a shaft 4 in a stationary housing 6. In a simple kinematic reversal, it would also be possible with the same bearing arrangement to rotatably mount a housing 6, which forms a hub, on a rotationally fixed shaft 4 which serves in this case as an axle, in a way which need not be discussed in detail here. In the region illustrated in FIG. 1, the shaft 4 has a diameter step from a larger diameter D to a smaller diameter d.

The radial-axial rolling bearing 2 comprises a radial bearing unit 8 for accommodating radial forces, and an axial bearing unit 10, which is combined with said radial bearing unit 8, for accommodating axial forces.

The radial bearing unit 8 is composed substantially of a radial bearing ring 12, a radial bearing cage 14 and a row of rolling bodies 16 which are arranged in the radial bearing cage 14 and which are designed as rollers or needles.

The axial bearing unit 10 is composed substantially of an axial bearing ring 18, an axial bearing cage 20 and a row of rolling bodies 22 which are arranged in said axial bearing cage 20 and which are likewise designed as rollers or needles.

As can be seen from FIG. 1, the radial bearing unit 8 is assigned to the circumferential surface 24 with the larger diameter D, specifically in such a way that the radial bearing ring 12 forms an inner ring and, therefore, the radially inner rolling surface for the rolling bodies 16. The outer rolling surface for the rolling bodies 16 is formed on an inner circumferential surface 26, which is coaxial with respect to the circumferential surface 24, of the housing 6.

The axial bearing ring 18 of the axial bearing unit 10 bears against the axial surface 28 which forms the transition from the larger diameter D to the smaller diameter d, and forms a first rolling surface for the rolling bodies 22. The other rolling surface is formed by an axial surface 30 which is situated opposite the axial bearing ring 18 and which is formed on the housing 6.

The radially outer rim 32 of the axial bearing ring 18 is latched to that rim 34 of the radial bearing ring 12 which faces toward said radially outer rim 32, such that the radial bearing unit 8, on the one hand, and the axial bearing unit 10, on the other hand, form a structural unit but remain functionally separate. For this purpose, latching means 36 are formed on the rim 34 of the radial bearing ring 12, into which latching means the axial bearing ring 18 is latched or clipped. The latching means 36 may, for example, be formed such that, as shown in FIG. 1, the rim edge is bent downward slightly. In order to increase the elasticity of the latching means 36 and thereby facilitate a latching or unlatching of the axial bearing ring, the rim edge may be discontinuous, so as to form individual latching lugs distributed about the circumference, in a way which need not be discussed in detail.

Similarly, latching means 38 are formed on the radially inner rim of the axial bearing ring 18, which latching means 38 hold the axial bearing cage 20.

In the latched state of the radial bearing ring 12 or axial bearing ring 18, these form a structural unit, such that the radial-axial rolling bearing can be assembled in one work step.

FIG. 2 shows an arrangement which is similar to FIG. 1 and which differs therefrom only in the way in which the radial bearing ring 112 is latched to the axial bearing ring 118. In this case, the latching means 138 are formed on the radially outer rim 132 of the axial bearing ring 118, specifically on the rim edge of the latter, into which latching means 138 the rim 134, which faces toward the rim 132 and which is bent radially outward in the manner of a flange, of the radial bearing ring 112 is latched or clipped. The latching means 138 are again preferably designed as latching lugs which are distributed about the circumference.

As shown in FIGS. 1 and 2, the radial bearing rings 12 and 112 and the axial bearing rings 18 and 118 are formed in each case as sheet-metal rings shaped in a non-cutting process.

LIST OF REFERENCE SYMBOLS

2 Radial-axial needle bearing
4 Shaft
6 Housing
8 Radial bearing unit
10 Axial bearing unit
12 Radial bearing ring
14 Radial bearing cage
16 Rolling bodies
18 Axial bearing ring
20 Axial bearing cage
22 Rolling bodies
24 Outer circumferential surface
26 Inner circumferential surface
28 Axial surface
30 Axial surface
32 Radially outer rim
34 Rim 36 Latching means
38 Latching means
112 Radial bearing ring
118 Axial bearing ring
132 Radially outer rim
134 Rim
138 Latching means
D Larger diameter
d Smaller diameter

The invention claimed is:

1. A combined radial-axial rolling bearing for rotatably mounting a rotary body in a region of a diameter step thereof from a larger diameter to a smaller diameter, comprising:
 a radial bearing unit for a circumferential surface of the rotary body, said radial bearing unit having at least a radial bearing ring, said radial bearing ring being an inner ring of said radial bearing unit; and
 an axial bearing unit for an axial surface of the rotary body at said diameter step, said axial bearing unit having at least has an axial bearing ring,
 wherein the radial bearing unit is for the circumferential surface a having said larger diameter, with a radially outer rim of the axial bearing ring being latched to a rim of the radial bearing ring which faces toward the radially outer rim of the axial bearing ring.

2. The combined radial-axial rolling bearing of claim 1, wherein the radial bearing ring and/or the axial bearing ring are/is formed as a sheet-metal ring shaped in a non-cutting process.

3. The combined radial-axial rolling bearing of claim 1, further comprising a radial bearing cage on an outer side of the radial bearing ring and holds, said radial bearing cage holding rolling bodies.

4. The combined radial-axial rolling bearing of claim 3, wherein the rolling bodies are rollers or needles.

5. The combined radial-axial rolling bearing of claim 1, wherein said axial bearing ring is for bearing against the axial surface at said diameter step, and further comprising an axial bearing cage on a side of the axial bearing ring facing away from said radial bearing unit, the axial bearing cage holding rolling bodies.

6. The combined radial-axial rolling bearing of claim 5, wherein the rolling bodies are rollers or needles.

7. The combined radial-axial rolling bearing of claim 1, wherein latching means are arranged on at least one of the rims, which face toward one another, of the radial bearing ring or of the axial bearing ring, into which latching means the respective other of the rims is latched.

8. The combined radial-axial rolling bearing of claim 7, wherein the latching means are formed as latching lugs which are arranged distributed about the rim of the radial bearing ring.

* * * * *